United States Patent [19]

Hattori et al.

[11] Patent Number: 5,008,509

[45] Date of Patent: Apr. 16, 1991

[54] PRODUCTION METHOD OF HONEYCOMB DIE-FORMING ELECTRICAL DISCHARGE MACHINING ELECTRODES AND PRODUCTION METHOD OF HONEYCOMB DIES

[75] Inventors: Isao Hattori, Nagoya; Shoji Futamura, Kawasaki, both of Japan

[73] Assignees: NGK Insulators, Ltd., Nagova City; Institute of Technology Precision Electrical discharge Works, Kawasaki, both of Japan

[21] Appl. No.: 493,666

[22] Filed: Mar. 15, 1990

[30] Foreign Application Priority Data

Mar. 20, 1989 [JP] Japan .................................. 1-68806

[51] Int. Cl.$^5$ .......................... B23H 9/00; B23H 1/04; B29C 47/12; B24B 53/06
[52] U.S. Cl. .................... 219/69.15; 51/325; 51/206 R; 125/11.01; 219/69.17; 425/464
[58] Field of Search ................. 219/69.15, 69.17, 69.2; 425/461, 462, 464; 76/107.1; 125/11.01, 11.23; 51/325, 206 R

[56] References Cited

U.S. PATENT DOCUMENTS

| 3,768,344 | 10/1973 | Feldcamp | 219/69.17 |
| 3,777,595 | 12/1973 | Hausermann et al. | 76/107.1 |
| 4,403,131 | 9/1983 | Cunningham et al. | 219/69.17 |
| 4,571,892 | 2/1986 | Brill | 125/11.23 |
| 4,722,819 | 2/1988 | Lundsager | 425/462 |
| 4,811,722 | 3/1989 | Brehm et al. | 125/11.01 |

FOREIGN PATENT DOCUMENTS

| 2199673 | 12/1974 | France | 219/69.15 |
| 63-28522 | 2/1988 | Japan | 219/69.15 |

Primary Examiner—Geoffrey S. Evans
Attorney, Agent, or Firm—Armstrong, Nikaido, Marmelstein, Kubovcik & Murray

[57] ABSTRACT

A method of making a honeycomb die by using an electrode with parallel grooves in an electrical discharge machining process. The parallel grooves in the electrode are formed by a grinding wheel having a reverse tapered shape. The grinding wheel is progressively dressed during cutting of the parallel grooves.

6 Claims, 5 Drawing Sheets

PRODUCTION METHOD OF HONEYCOMB DIE-FORMING ELECTRICAL DISCHARGE MACHINING ELECTRODES AND PRODUCTION METHOD OF HONEYCOMB DIES

FIELD OF THE INVENTION

This invention relates to a method for the production of an electrical discharge machining electrode for forming a honeycomb die and to a method for the production of a honeycomb die. Specifically, it is concerned with a production method of an electrical discharge machining electrode suitable for use in forming an extruding die for forming a honeycomb structure (hereinafter referred to as "honeycomb die"), in which an electrical discharge machining electrode adapted to use for cutting forming grooves in the honeycomb die by electrical discharge machining, the dimensions in width of said forming grooves being controlled so as to become greater continuously or stepwise from its center toward the periphery, is produced with high accuracy and efficiency, and with a method for the production of a honeycomb die by making use of the honeycomb die-forming electrical discharge machining electrode.

In general, honeycomb structures, particularly, ceramic-made honeycomb structures have been widely used in various fields as carriers for catalysts useful for purifying exhaust gases from internal combustion engines and combustion furnaces for various kinds of industries, heat-accumulating members of heat exchangers and the like. Extruder-die assemblies have been employed in production of the honeycomb structures. Namely, each of the extruder-die assemblies is equipped with a honeycomb die, in which forming grooves are provided having a configuration corresponding to the profile of a honeycomb structure. A raw material is pressed in and extruded through the forming grooves of the honeycomb die, thereby forming the honeycomb structure.

Highly accurate electrical discharge machining has been known to date as a means for machining the forming grooves of the above honeycomb die. When the forming grooves of the honeycomb die are machined by the electrical discharge machining, an electrical discharge machining electrode having a configuration corresponding to the forming grooves is required. Accordingly, in order to machine forming grooves in a honeycomb die, the width of said forming grooves becomes greater continuously or stepwise from the center toward the periphery by way of example. Thus, it is necessary to produce an electrical discharge machining electrode having a configuration corresponding to the forming grooves. It is not easy to produce the electrical discharge machining electrode having such a complex configuration with high accuracy and efficiency. For this reason, there has been a demand for the realization of a production method of an electrical discharge machining electrode for forming a honeycomb die, in which an electrical discharge machining electrode capable of machining forming grooves in the honeycomb die, the dimensions in width of said forming grooves becoming greater continuously or stepwise from the center toward the periphery, as described above, is successfully produced with high accuracy and efficiency. Needless to say, there has also been a demand for the production of the honeycomb die by making use of the electrical discharge machining electrode thus produced with high precision.

SUMMARY OF THE INVENTION

It is a principal object of this invention is to provide a method for the production of an electrical discharge machining electrode for forming a honeycomb die, said electrode being provided with a plurality of electrode groove portions formed by cutting parallel grooves in an electrode material and with a plurality of projecting electrode portions corresponding to forming grooves of the honeycomb die and formed between their corresponding electrode groove portions, comprising the steps of:

cutting said parallel grooves by means of a grinding wheel formed in a reverse tapered shape in which the grinding width is gradually widened toward its peripheral direction; and progressively dressing said grinding wheel during the cutting of said parallel grooves.

Another object of this invention is to provide a method for the production of the electrical discharge machining electrode, wherein:

a plurality of grooves are cut in the electrode material by moving the grinding wheel relative to the electrode material so as to cut a groove in the electrode material, and subsequent to the cutting of the groove, relatively moving the grinding wheel and the electrode material by desired pitches in a direction perpendicular to the grinding direction, and dressing the grinding surface of the grinding wheel at every pitch width relative to the movement of the grinding wheel and the electrode material toward the directions of both ends from the center portion for the purpose of narrowing the grinding width, whereby a plurality of electrode groove portions are formed.

A further object of this invention is to provide a method for the production of an electrical discharge machining electrode for forming a honeycomb die, said electrode being provided with a plurality of electrode groove portions formed by cutting parallel grooves in an electrode material by means of a grinding wheel and with a plurality of projecting electrode portions corresponding to forming grooves of the honeycomb die and formed between their corresponding electrode groove portions, the improvement wherein:

the grinding wheel is formed into a reverse tapered shape in which the grinding width is gradually widened toward its peripheral direction; and a plurality of grooves are cut in the electrode material by moving the grinding wheel relative to the electrode material so as to cut a groove in the electrode material, and subsequent to the cutting of the groove, relatively moving the grinding wheel and the electrode material by desired pitches in a direction perpendicular to the grinding direction, and dressing the grinding surface of the grinding wheel at plural pitch distances relative to the movement of the grinding wheel and the electrode material toward the directions of both ends from the center portion for the purpose of narrowing the grinding width, whereby a plurality of electrode groove portions are formed.

A still further object of this invention is to provide a method for the production of a honeycomb die provided with forming grooves, which have configurations corresponding to the profile of a honeycomb structure and are to be formed by electrical discharge machining making use of a honeycomb die-forming electrical discharge machining electrode provided with a plurality of projecting electrode portions corresponding to the forming grooves, which comprises;

using, as the honeycomb die-forming electrical discharge machining electrode, a honeycomb die-forming electrical discharge machining electrode provided with a plurality of electrode groove portions, which have been formed by cutting a plurality of grooves in an electrode material while moving a grinding wheel formed into a reverse tapered shape, in which the grinding width is gradually widened toward its peripheral direction, relative to the electrode material so as to cut a groove in the electrode material, and subsequent to the cutting of the groove, relatively moving the grinding wheel and the electrode material by desired pitches in a direction perpendicular to the grinding direction, and dressing the grinding surface of the grinding wheel at every pitch width relative to the movement of the grinding wheel and the electrode material toward the directions of both ends from the center portion for the purpose of narrowing the grinding width, and at the same time provided with a plurality of projecting electrode portions formed between their corresponding electrode groove portions, owing to the formation of the plural electrode groove portions, in such a manner that the dimensions in thickness of the plural projecting electrode portions become greater continuously toward both ends from the center of the electrode.

A still yet further object of this invention is to provide a method for the production of the honeycomb die, further comprising:

cutting forming grooves being in rows in one direction relative to a material to be formed by electrical discharge machining making use of the honeycomb die-forming electrical discharge machining electrode; and cutting forming grooves in a direction crossing perpendicularly to said one direction by electrical discharge machining making use of the honeycomb die-forming electrical discharge machining electrode in a condition that the honeycomb die-forming electrical discharge machining electrode and the material to be formed have been relatively rotated by 90°, thereby cutting forming grooves, whose dimensions in width become greater continuously toward both ends from the center, in the honeycomb die.

A still yet further object of this invention is to provide a method for the production of a honeycomb die provided with forming grooves, which have configurations corresponding to the profile of a honeycomb structure to be formed and are to be formed by electrical discharge machining using a honeycomb die-forming electrical discharge machining electrode provided with a plurality of projecting electrode portions corresponding to the forming grooves, which comprises;

using, as the honeycomb die-forming electrical discharge machining electrode, a honeycomb die-forming electrical discharge machining electrode provided with a plurality of electrode groove portions, which have been formed by cutting a plurality of grooves in an electrode material while moving a grinding wheel formed into a reverse tapered shape, in which the grinding width is gradually widened toward its peripheral direction, relative to the electrode material so as to cut a groove in the electrode material, and subsequent to the cutting of the groove, relatively moving the grinding wheel and the electrode material by desired pitches in a direction perpendicular to the grinding direction, and dressing the grinding surface of the grinding wheel at plural pitch distances relative to the movement of the grinding wheel and the electrode material toward the directions of both ends from the center portion for the purpose of narrowing the grinding width, and at the same time provided with a plurality of projecting electrode portions formed between their corresponding electrode groove portions, owing to the formation of the plural electrode groove portions, in such a manner that the thicknesses of the plural projecting electrode portions become greater stepwise toward both ends from the center of the electrode;

cutting, as a first machining step, forming grooves being in rows in one direction relative to a material to be formed by electrical discharge machining making use of the honeycomb die-forming electrical discharge machining electrode; and after completion of the first machining step, cutting, as a second machining step, forming grooves in a direction crossing perpendicularly to said one direction by electrical discharge machining making use of the honeycomb die-forming electrical discharge machining electrode in a condition that the honeycomb die-forming electrical discharge machining electrode and the material to be formed have been relatively rotated 90°;

thereby cutting forming grooves, whose dimensions in width become greater stepwise toward both ends from the center, in the honeycomb die.

Other objects and advantages of the present invention will be readily appreciated from the preferred embodiments of this invention, which will be described subsequently in detail with reference to the accompanying drawings.

DETAILED DESCRIPTION OF THE PREFERRED EMBODIMENTS

Figure 1:
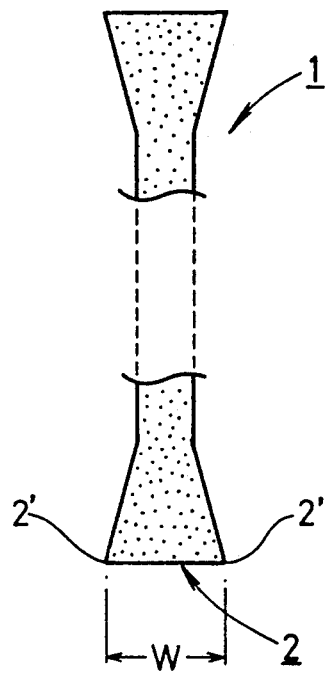
FIG. 1 is an explanatory illustration, in cross section, of a grinding wheel suitable for use in forming or machining an electrical discharge machining electrode according to this invention.

FIG. 1 illustrates a cross-sectional view of a grinding wheel 1 employed in the production method of the honeycomb die-forming electrical discharge machining electrodes according to this invention. Namely, the grinding wheel 1 is formed into a reverse tapered shape in which the grinding width in cross section is gradually widened toward its peripheral direction. Therefore, it is possible to control the grinding width W (distance between grinding edges 2' and 2') of a grinding surface 2 to a desired distance by dressing the grinding surface 2. The production method of the electrodes in this invention, which is conducted by making use of the above grinding wheel 1, will hereinafter be described with reference to FIG. 2 through FIG. 4.

Figure 2:
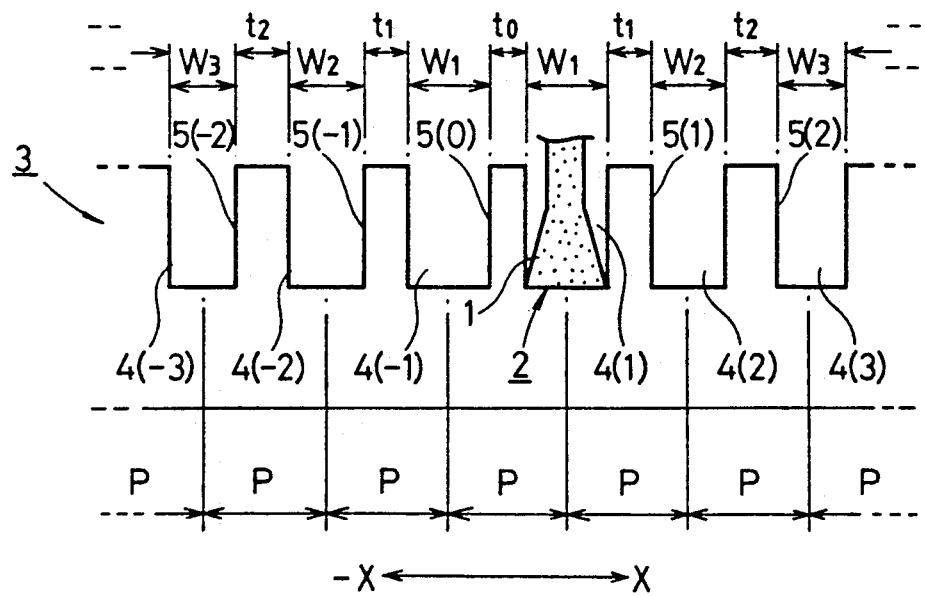
FIG. 2 is an explanatory illustration showing a production method of an electrical discharge machining electrode for forming a honeycomb die according to this invention.

In the production method of electrodes in this invention, as is illustrated in FIG. 2, the grinding wheel 1 is relatively moved in a depth direction in the drawing on an electrode material 3 to form a electrode groove portion 4. A plurality of parallel electrode groove portions 4 having a predetermined depth are similarly cut while the grinding wheel 1 is moved repeatedly and in parallel with the thus-formed electrode groove portion 4 at a desired pitch P, whereby projecting electrode portions 5 ar formed between their corresponding electrode groove portions 4. Incidentally, the pitch P between adjacent electrode groove portions 4 and respective thicknesses $t_0, t_1, t_2 \ldots$ of the projecting electrode portions 5 have been predetermined. Desired electrode 6 (FIG. 3) and electrode 7 (FIG. 4) can hence be produced by controlling a grinding width W of the grinding surface 2 in the grinding wheel 1 by dressing, and by parallel-moving the grinding wheel 1 at a pitch P.

Figure 3:
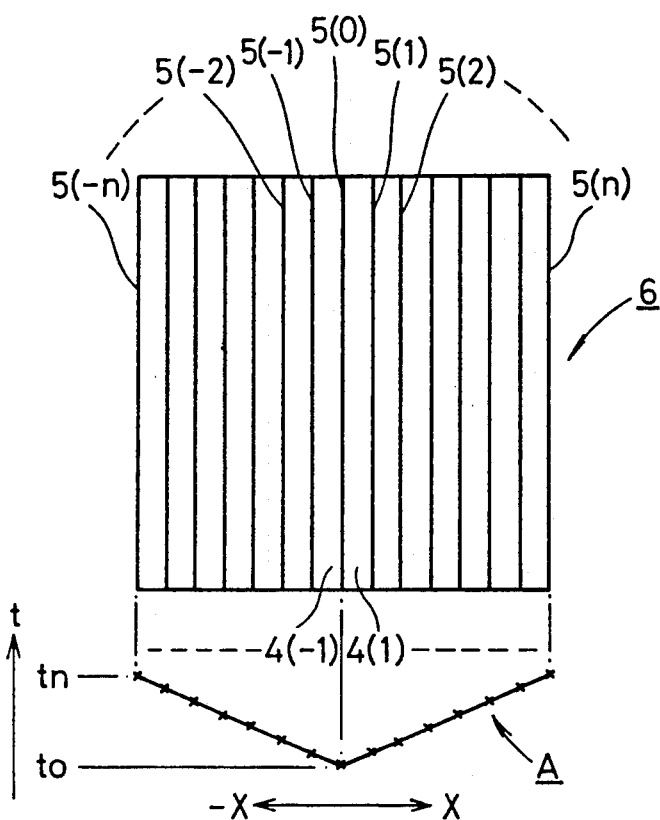
FIG. 3 is an explanatory illustration showing one embodiment of an electrical discharge machining electrode produced in accordance with a production method of this invention.

In FIG. 3, although respective projecting electrode portions 5 are diagrammatically indicated by solid lines, the projecting electrode portion 5(0) situated at the center has a thickness of $t_0$ as is illustrated in FIG. 2. Similarly, the projecting electrodes 5(1) and 5(−1), the projecting electrodes 5(2) and 5(−2), ..., and the projecting electrodes 5(n) and 5(−n) have thicknesses of $t_1, t_2, \ldots, t_n$ respectively. The V-shaped line A drawn in the lower part of FIG. 3 indicates changes of the thicknesses t of the projecting electrode portions 5(0) through 5(n) and 5(−n). Namely, the electrode 6 is formed in such a manner that supposing the thickness of the projecting electrode portion 5(0) situated at the center is $t_0$, the thicknesses t of the projecting electrode portions 5 become greater continuously toward X and −X directions.

Figure 4:
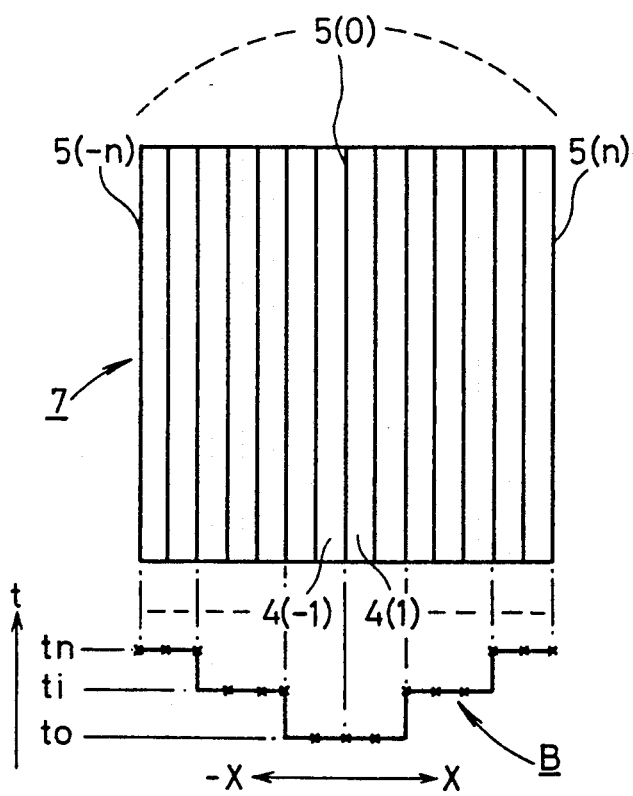
FIG. 4 is an explanatory illustration showing another embodiment of a electrical discharge machining electrode produced in accordance with the production method of this invention.

Similarly, the electrode 7 depicted in FIG. 4, as is indicated by a step-like line B drawn in the lower part of FIG. 4, is formed in such a manner that supposing the thickness of the projecting electrode portion 5(0) situated at the center is $t_0$, the thicknesses t of the projecting electrode portions 5 become greater stepwise toward X and −X directions.

The production method of the electrode 6 illustrated in FIG. 3 will hereinafter be described specifically with reference to FIG. 2.

Figure 5:
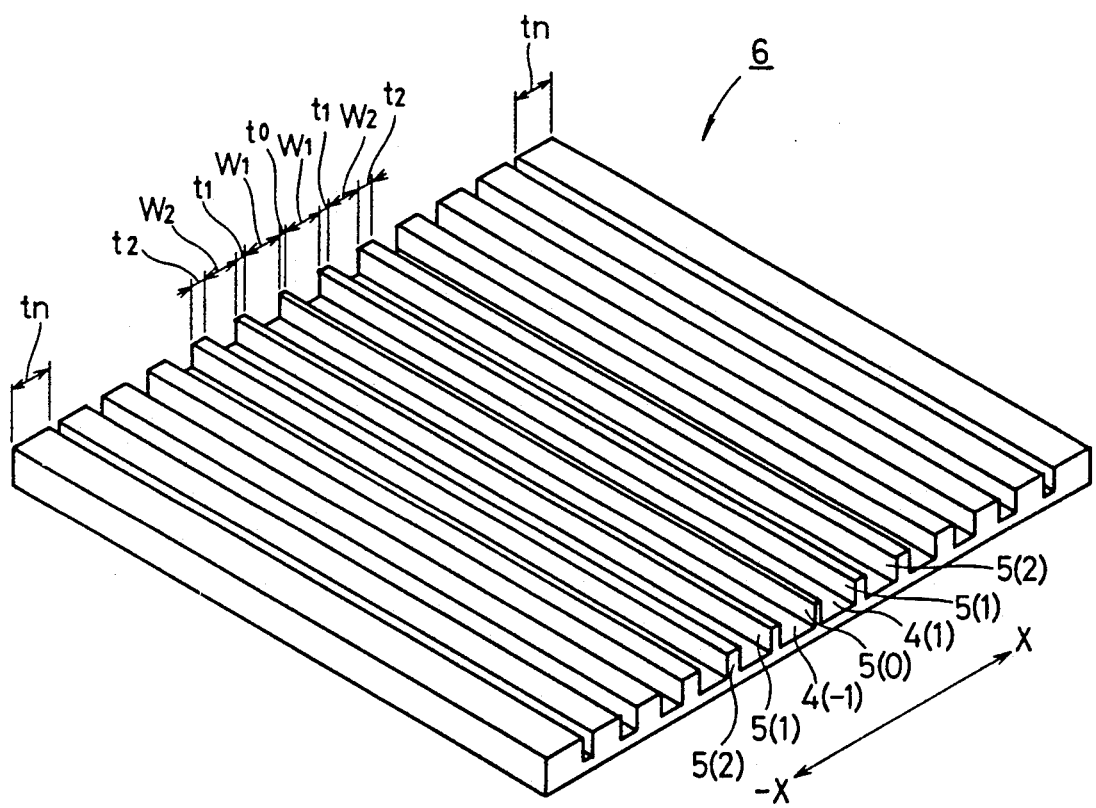
FIG. 5 is a perspective view of the electrical discharge machining electrode illustrated in FIG. 3.

In FIG. 2, the grinding surface 2 of a grinding wheel 1 illustrated in FIG. 1 is dressed to control a grinding width W to $W_1$ so as to cut a groove, thereby forming a electrode groove portion 4(1). Incidentally, the grinding width $W_1$ is supposed to be $(P-t_0)$. The grinding wheel 1 is then moved by a distance P in a −X direction to cut a groove so as to form a electrode groove portion 4(−1). As a result, a projecting electrode portion 5(0) having a thickness of $t_0$ is formed between the electrode groove portions 4(1) and 4(−1). The grinding width W is then changed from $W_1$ to $W_2$ by dressing and at the same time, the grinding wheel 1 is moved by a distance P in the −X direction. A groove is then cut to form a electrode groove portion 4(−2), whereby a projecting electrode portion 5(−1) having a thickness of $t_1$ is formed between the electrode groove portion 4(−2) and the electrode groove portions 4(−1). By the way, supposing $(t_1-t_0)$ is $\Delta t$, the grinding width $W_2$ is $(W_1-2\times\Delta t)$. The grinding wheel 1 is then moved by a distance 3P in an X direction. A groove is cut to form a electrode groove portion 4(2). As a result, a projecting electrode portion 5(1) having a thickness of $t_1$ is formed between the electrode groove portions 4(1) and the electrode groove portion 4(2). Thereafter, the grinding surface 2 of the grinding wheel 1 is dressed in order in the same manner as described above to cut grooves of electrode groove portions 4(3), 4(−3), ..., thereby forming projecting electrode portions 5(2), 5(−2), .... As a result, an electrode 6 having a shape of comb's teeth in cross section in the X−(−X) direction, as illustrated in FIG. 2, and depicted in FIG. 3 is produced. Incidentally, in the description of the production process of the above electrode 6, the description has been given as moving the grinding wheel 1. However, the electrode material 3 may be caused to move. A perspective view of the electrode 6 thus produced is shown in FIG. 5.

The production method of an electrode 7 illustrated in FIG. 4 is basically the same as that of the electrode 6. Namely, in the production of the electrode 6, the dressing of the grinding wheel 1 has been conducted every other groove cutting, i.e., formation of every two electrode groove portions. In the production of the electrode 7, the dressing may however be conducted at every fourth or sixth groove cutting, i.e., formation of every four or six electrode groove portions. As a result, the electrode 7, as is indicated by a step-like line B drawn in the lower part of FIG. 4, is formed in such a manner that supposing the thickness of the projecting electrode portion 5(0) situated at the center is $t_0$, the thicknesses t of the projecting electrode portions 5 become greater stepwise toward X and −X directions. Incidentally, in the embodiment illustrated in FIG. 4, the thicknesses t of the projecting electrode portions 5 have been changed at three steps. However, such changes are not limited thereto. It is also possible to change the thicknesses t of the projecting electrode portions at every two steps, or four steps or more.

The production method of honeycomb dies according to this invention, in which forming grooves for forming honeycomb structures are cut by electrical discharge machining making separate use of the electrodes 6 and 7, is then described with reference to FIGS. 6 and 7.

Figure 6:
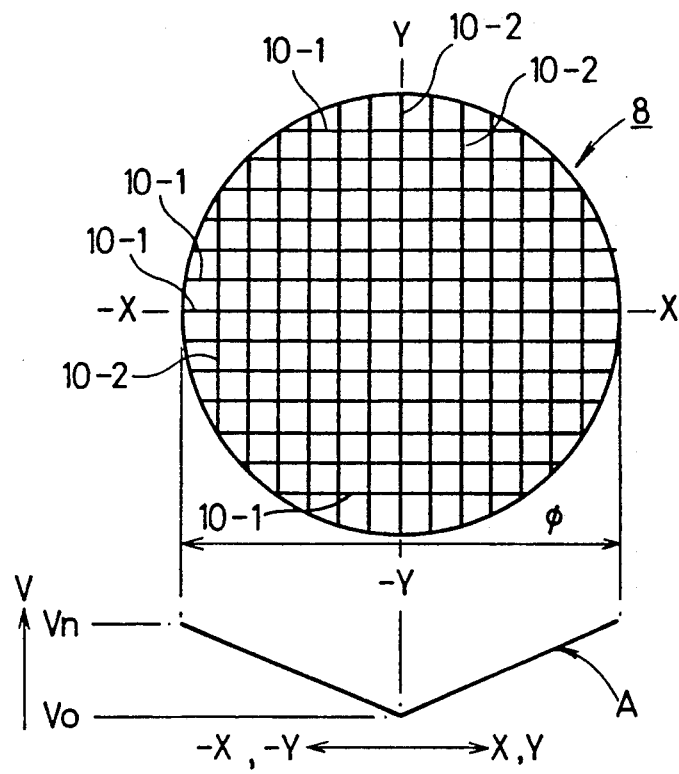
FIG. 6 is an explanatory illustration showing one embodiment of a honeycomb die produced in accordance with a production method of this invention.
Figure 8:
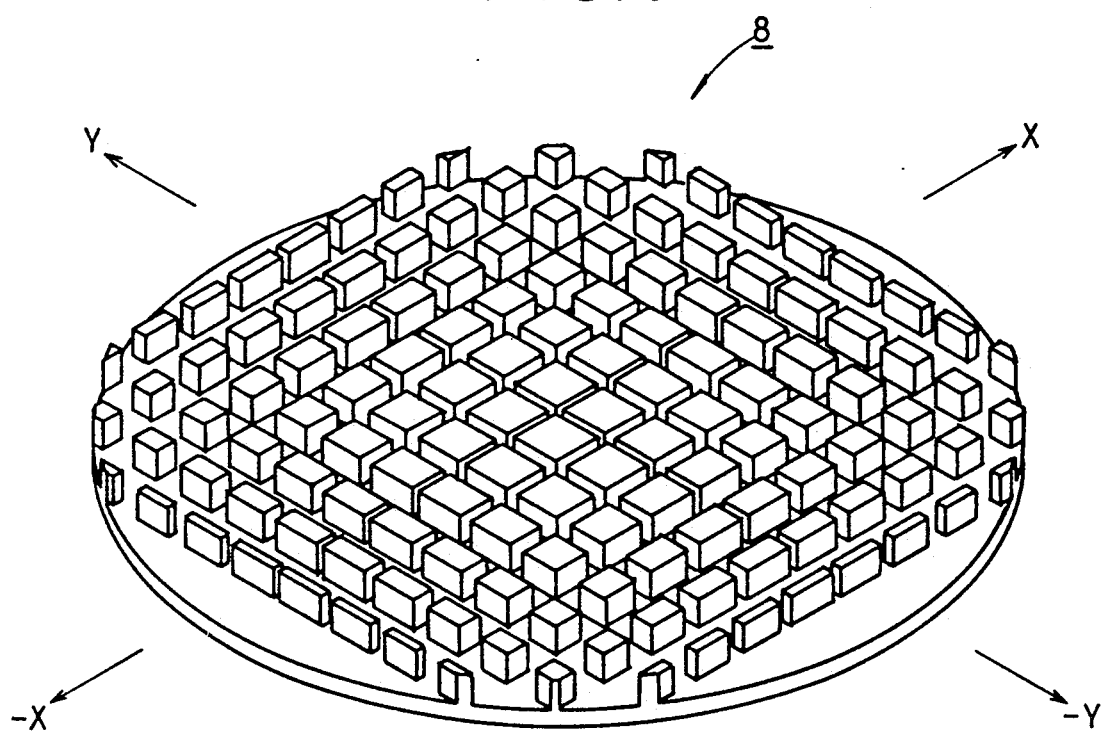
FIG. 8 is a perspective view of the honeycomb die illustrated in FIG. 6.

A honeycomb die 8 illustrated in FIG. 6 has forming grooves 10 cut by electrical discharge machining making use of the electrode 6. The honeycomb die 8 is formed in the following manner. Namely, after forming grooves 10-1 in an X−(−X) direction by way of example are cut by the electrical discharge machining making use of the electrode 6, forming grooves 10-2 in a Y−(−Y) direction are cut in a condition that the electrode 6 has been rotated by 90°. Since the electrode 6 has been formed in such a manner that supposing the thickness of the projecting electrode portion 5(0) situated at the center is $t_0$, the thicknesses t of the projecting electrode portions 5 become greater continuously toward X and −X directions, the groove widths V of the forming grooves 10 in the honeycomb die 8, as is indicated by a V-shaped line A drawn in the lower part of FIG. 6, are defined in such a manner that they correspond respectively to the thicknesses $t_0, \ldots,$ and $t_n$ and $t_n$ of the projecting electrode portions $5(0), \ldots,$ and $5(n)$ and $5(-n)$ in the electrode 6, and become greater continuously toward X and $-X$ directions and Y and $-Y$ directions, supposing the groove width of the forming groove 10 situated at the center is $V_0$. A perspective view of the honeycomb die 8 thus produced is shown in FIG. 8.

Figure 7:
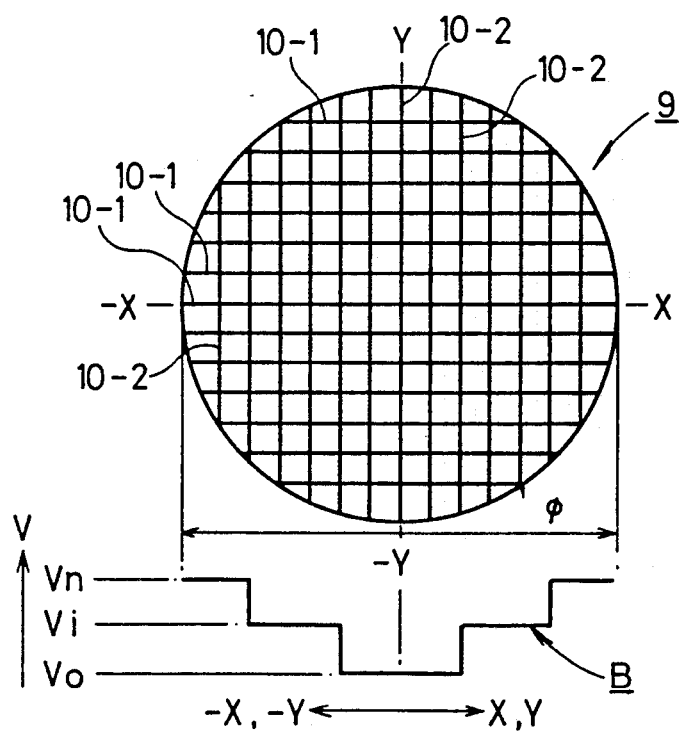
FIG. 7 is an explanatory illustration showing another embodiment of a honeycomb die produced in accordance with the production method of this invention.

A honeycomb die 9 illustrated in FIG. 7 has forming grooves 10 cut by electrical discharge machining making use of the electrode 7. The honeycomb die 9 is formed in the following manner. Namely, after forming grooves 10-1 in an $X-(-X)$ direction by way of example are cut by the electrical discharge machining making use of the electrode 7, forming grooves 10-2 in a $Y-(-Y)$ direction are cut in a condition that the electrode 7 has been rotated by 90°. Since the electrode 7 has been formed in such a manner that supposing the thickness of the projecting electrode portion 5(0) situated at the center is $t_0$, the thicknesses t of the projecting electrode portions 5 become greater stepwise toward X and $-X$ directions, the groove widths V of the forming grooves 10 in the honeycomb die 9, as is indicated by a step-like line B drawn in the lower part of FIG. 7, are defined in such a manner that they correspond respectively to the thicknesses $t_0, \ldots,$ and tn and tn of the projecting electrode portions $5(0), \ldots,$ and $5(n)$ and $5(-n)$ in the electrode 7, and become greater stepwise toward X and $-X$ directions and Y and $-Y$ directions, supposing the groove width of the forming groove 10 situated at the center is $V_0$. Incidentally, in the embodiment illustrated in FIG. 7, the groove widths V of the forming grooves 10 have been changed at three steps. However, such changes are not limited thereto. It is also possible to provide a honeycomb die, wherein the groove widths V of the forming grooves have been changed at every two steps, or four steps or more when using an electrode in which the thicknesses t of the projecting electrode portions 5 in the electrode 7 have been changed at every two steps, or four steps or more.

Although the production method of the honeycomb dies in this invention has been described above, illustrative honeycomb dies actually produced in accordance with the embodiments of the production method of honeycomb dies in this invention will hereinafter be described. Namely, in the embodiment corresponding to the honeycomb die 8, the honeycomb die produced has an external dimension $\phi$ of 140 mm, a pitch P between forming grooves of 1.4 mm, $V_0$ of 290 $\mu$m and $V_n$ of 310 $\mu$m in FIG. 6. On the other hand, in the embodiment corresponding to the honeycomb die 9, the honeycomb die produced has an external dimension $\phi$ of 140 mm, a pitch P between forming grooves of 1.4 mm, $V_0$ of 290 $\mu$m, $v_i$ of 300 $\mu$m and $V_n$ of 310 $\mu$m in FIG. 7.

As has been described above, according to this invention, there can be provided a method for the production of electrical discharge machining electrodes suitable for use in forming extruding dies for forming honeycomb structures, in which an electrical discharge machining electrode for cutting forming grooves in a honeycomb die by electrical discharge machining, the dimensions in width of said forming grooves being controlled so as to become greater continuously or stepwise toward its periphery from the center, is successfully produced with high accuracy and efficiency, and a method for the production of honeycomb dies by making use of the honeycomb die-forming electrical discharge machining electrodes is also provided.

What is claimed is:

1. A method for the production of an electrical discharge machining electrode for forming a honeycomb die, said electrode being provided with a plurality of electrode groove portions formed by cutting parallel grooves in an electrode material and with a plurality of projecting electrode portions corresponding to forming grooves of the honeycomb die and formed between their corresponding electrode groove portions, comprising the steps of:

cutting said parallel grooves by means of a grinding wheel formed in a reverse tapered shape in which the grinding width is gradually widened toward its peripheral direction; and progressively dressing said grinding wheel during the cutting of said parallel grooves.

2. The method of claim 1 wherein:

a plurality of grooves are cut in the electrode material by moving the grinding wheel relative to the electrode material so as to cut a groove in the electrode material, and subsequent to the cutting of the groove, relatively moving the grinding wheel and the electrode material by desired pitches in a direction perpendicular to the grinding direction, and dressing the grinding surface of the grinding wheel at every pitch width relative to the movement of the grinding wheel and the electrode material toward the directions of both ends from the center portion for the purpose of narrowing the grinding width, whereby a plurality of electrode groove portions are formed.

3. In a method for the production of an electrical discharge machining electrode for forming a honeycomb die, said electrode being provided with a plurality of electrode groove portions formed by cutting parallel grooves in an electrode material by means of a grinding wheel and with a plurality of projecting electrode portions corresponding to forming grooves of the honeycomb die and formed between their corresponding electrode groove portions, the improvement wherein:

the grinding wheel is formed into a reverse tapered shape in which the grinding width is gradually widened toward its peripheral direction; and a plurality of grooves are cut in the electrode material by moving the grinding wheel relative to the electrode material so as to cut a groove in the electrode material, and subsequent to the cutting of the groove, relatively moving the grinding wheel and the electrode material by desired pitches in a direction perpendicular to the grinding direction, and dressing the grinding surface of the grinding wheel at plural pitch distances relative to the movement of the grinding wheel and the electrode material toward the directions of both ends from the center portion for the purpose of narrowing the grinding width, whereby a plurality of electrode groove portions are formed.

4. A method for the production of a honeycomb die provided with forming grooves, which have configurations corresponding to the profile of a honeycomb structure and are to be formed by electrical discharge machining making use of a honeycomb die-forming electrical discharge machining electrode provided with a plurality of projecting electrode portions corresponding to the forming grooves, which comprises;

using, as the honeycomb die-forming electrical discharge machining electrode, a honeycomb die-forming electrical discharge machining electrode provided with a plurality of electrode groove portions, which have been formed by cutting a plurality of grooves in an electrode material while moving a grinding wheel formed into a reverse tapered shape, in which the grinding width is gradually widened toward its peripheral direction, relative to the electrode material so as to cut a groove in the electrode material, and subsequent to the cutting of the groove, relatively moving the grinding wheel and the electrode material by desired pitches in a direction perpendicular to the grinding direction, and dressing the grinding surface of the grinding wheel at every pitch width relative to the movement of the grinding wheel and the electrode material toward the directions of both ends from the center portion for the purpose of narrowing the grinding width, and at the same time provided with a plurality of projecting electrode portions formed between their corresponding electrode groove portions, owing to the formation of the plural electrode groove portions, in such a manner that the dimensions in thickness of the plural projecting electrode portions become greater continuously toward both ends from the center of the electrode.

5. The method of claim 4 further comprising:

cutting forming grooves being in rows in one direction relative to a material to be formed by electrical discharge machining making use of the honeycomb die-forming electrical discharge machining electrode; and cutting forming grooves in a direction crossing perpendicularly to said one direction by electrical discharge machining making use of the honeycomb die-forming electrical discharge machining electrode in a condition that the honeycomb die-forming electrical discharge machining electrode and the material to be formed have been relatively rotated by 90°, thereby cutting forming grooves, whose dimensions in width become greater continuously toward both ends from the center, in the honeycomb die.

6. A method for the production of a honeycomb die provided with forming grooves, which have configurations corresponding to the profile of a honeycomb structure to be formed and are to be formed by electrical discharge machining using a honeycomb die-forming electrical discharge machining electrode provided with a plurality of projecting electrode portions corresponding to the forming grooves, which comprises;

using, as the honeycomb die-forming electrical discharge machining electrode, a honeycomb die-forming electrical discharge machining electrode provided with a plurality of electrode groove portions, which have been formed by cutting a plurality of grooves in an electrode material while moving a grinding wheel formed into a reverse tapered shape, in which the grinding width is gradually widened toward its peripheral direction, relative to the electrode material so as to cut a groove in the electrode material, and subsequent to the cutting of the groove, relatively moving the grinding wheel and the electrode material by desired pitches in a direction perpendicular to the grinding direction, and dressing the grinding surface of the grinding wheel at plural pitch distances relative to the movement of the grinding wheel and the electrode material toward the directions of both ends from the center portion for the purpose of narrowing the grinding width, and at the same time provided with a plurality of projecting electrode portions formed between their corresponding electrode groove portions, owing to the formation of the plural electrode groove portions, in such a manner that the thicknesses of the plural projecting electrode portions become greater stepwise toward both ends from the center of the electrode;

cutting, as a first machining step, forming grooves being in rows in one direction relative to a material to be formed by electrical discharge machining making use of the honeycomb die-forming electrical discharge machining electrode; and after completion of the first machining step, cutting, as a second machining step, forming grooves in a direction crossing perpendicularly to said one direction by electrical discharge machining making use of the honeycomb die-forming electrical discharge machining electrode in a condition that the honeycomb die-forming electrical discharge machining electrode and the material to be formed have been relatively rotated 90°;

thereby cutting forming grooves, whose dimensions in width become greater stepwise toward both ends from the center, in the honeycomb die.

* * * * *